(12) United States Patent
Spalding et al.

(10) Patent No.: US 12,391,011 B2
(45) Date of Patent: Aug. 19, 2025

(54) DOUBLE VACUUM DEBULK PROCESSING

(71) Applicant: The Boeing Company, Arlington, VA (US)

(72) Inventors: John F. Spalding, Renton, WA (US); Marc R. Matsen, Seattle, WA (US); Gwendolyn Marie Janda, Seattle, WA (US)

(73) Assignee: The Boeing Company, Arlington, VA (US)

( * ) Notice: Subject to any disclaimer, the term of this patent is extended or adjusted under 35 U.S.C. 154(b) by 76 days.

(21) Appl. No.: 18/348,131

(22) Filed: Jul. 6, 2023

(65) Prior Publication Data

US 2024/0157660 A1 May 16, 2024

Related U.S. Application Data

(60) Provisional application No. 63/383,154, filed on Nov. 10, 2022.

(51) Int. Cl.
*B29C 70/44* (2006.01)
*B29C 70/54* (2006.01)

(52) U.S. Cl.
CPC .......... *B29C 70/443* (2013.01); *B29C 70/544* (2021.05)

(58) Field of Classification Search
CPC ... B29C 43/10; B29C 70/44; B29C 2043/562; B29C 70/342
See application file for complete search history.

(56) References Cited

U.S. PATENT DOCUMENTS

| 6,017,484 | A  | * | 1/2000  | Hale     | B29C 70/342 |
|           |    |   |         |          | 156/286     |
| 2005/0253309 | A1 | * | 11/2005 | Hou      | B29C 35/02  |
|           |    |   |         |          | 264/571     |
| 2017/0095984 | A1 | * | 4/2017  | Anderson | B29C 70/342 |
| 2017/0350395 | A1 | * | 12/2017 | Schofield | C23C 16/4412 |

* cited by examiner

*Primary Examiner* — Matthew J Daniels
(74) *Attorney, Agent, or Firm* — Yee & Associates, P.C.

(57) ABSTRACT

Methods and a double vacuum processing system are presented. A double vacuum processing system comprises a first vacuum zone; a second vacuum zone encompassing the first vacuum zone; a first vacuum pump connected to the first vacuum zone and configured to draw a vacuum within the first vacuum zone; a second vacuum pump connected to the second vacuum zone and configured to draw a vacuum within the second vacuum zone; and a diverter valve. The diverter valve is configured to alternate between pneumatically connecting the first vacuum zone to the second vacuum pump or connecting the first vacuum zone to the first vacuum pump.

20 Claims, 11 Drawing Sheets

DOUBLE VACUUM DEBULK PROCESSING

CROSS-REFERENCE TO RELATED APPLICATION

This application claims the benefit of U.S. Provisional Patent Application Ser. No. 63/383,154, filed Nov. 10, 2022, and entitled "Improved Double Vacuum Debulk Processing," which is incorporated herein by reference in its entirety.

BACKGROUND INFORMATION

1. Field

The present disclosure relates generally to processing composite materials and more specifically to curing composite materials using a double vacuum debulk process and apparatus.

2. Background

Composite materials are strong, light-weight materials created by combining two or more functional components. For example, a composite material may include reinforcing fibers bound in polymer resin matrix. The fibers can take the form of a unidirectional tape, woven cloth or fabric, or a braid.

After the different layers of a composite laminate have been laid up, the layers of composite material may be consolidated and cured upon exposure to temperature and pressure, thus forming the final composite structure. Conventionally composite laminates are cured in an autoclave. Autoclaves are large, expensive, and have a high processing time. Autoclaves are often a bottleneck for manufacturing processes.

Therefore, it would be desirable to have a method and apparatus that takes into account at least some of the issues discussed above, as well as other possible issues.

SUMMARY

An embodiment of the present disclosure provides a double vacuum processing system. The double vacuum processing system comprises a first vacuum zone; a second vacuum zone encompassing the first vacuum zone; a first vacuum pump connected to the first vacuum zone and configured to draw a vacuum within the first vacuum zone; a second vacuum pump connected to the second vacuum zone and configured to draw a vacuum within the second vacuum zone; and a diverter valve. The diverter valve is configured to alternate between pneumatically connecting the first vacuum zone to the second vacuum pump or connecting the first vacuum zone to the first vacuum pump.

Another embodiment of the present disclosure provides a double vacuum processing system. The double vacuum process system comprises two vacuum pumps; a cure tool configured to support a composite laminate for curing; and a diverter valve. The cure tool comprises a first channel and a second channel, each of the first channel and the second channel extends through a thickness of the cure tool. The diverter valve is pneumatically connected to the first channel and the second channel. The diverter valve is configured to alternate between connecting a first vacuum zone formed in part by the cure tool to a respective one of the two vacuum pumps.

A further embodiment of the present disclosure provides a method of performing a cure cycle on a composite laminate. Vacuum is pulled in two vacuum zones using two vacuum pumps, the two vacuum zones comprising a first vacuum zone enclosing the composite laminate and a second vacuum zone enclosing the first vacuum zone. The two vacuum zones are pneumatically connected such that a single vacuum pump of the two vacuum pumps pulls vacuum in both the first vacuum zone and the second vacuum zone. Gas extraction is performed on the composite laminate while the two vacuum zones are pneumatically connected. The two vacuum zones are pneumatically isolated following gas extraction and prior to curing the composite laminate.

A yet further embodiment of the present disclosure provides a method of performing gas extraction in a double vacuum debulk of a composite laminate. A vacuum is pulled in a first vacuum zone enclosing the composite laminate. A second vacuum is pulled in a second vacuum zone enclosing the first vacuum zone. The composite laminate is heated while pulling the vacuum and the second vacuum. A diverter valve is activated to pneumatically connect the first vacuum zone to the second vacuum zone during heating in order to perform at least a portion of the gas extraction of the double vacuum debulk.

Another embodiment of the present disclosure provides a method of performing a thermal cycle in a double vacuum debulk of a composite laminate. A vacuum is drawn in a vacuum bag encompassing a composite laminate. A vacuum is drawn in a rigid chamber encompassing the vacuum bag. The vacuum bag is vented to the rigid chamber to equalize vacuum levels within the vacuum bag and the rigid chamber during a double vacuum portion of the thermal cycle. The vacuum bag is switched to a discrete vacuum source for a remainder of the thermal cycle.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that autoclaves are very expensive to acquire, maintain, and operate. Additionally, the use of autoclaves creates a bottle neck in the production system. There can be lengthy queue times for parts waiting to be cured.

The illustrative examples recognize and take into account that alternatives to autoclaves have been developed for curing composite laminates. Conventional double vacuum debulk and curing utilizes a double vacuum degassing step. Regulation of the vacuum within the two vacuum zones can be undesirably difficult. The illustrative examples present double vacuum debulk processes and apparatuses that allow for better control of vacuum levels.

Figure 1:
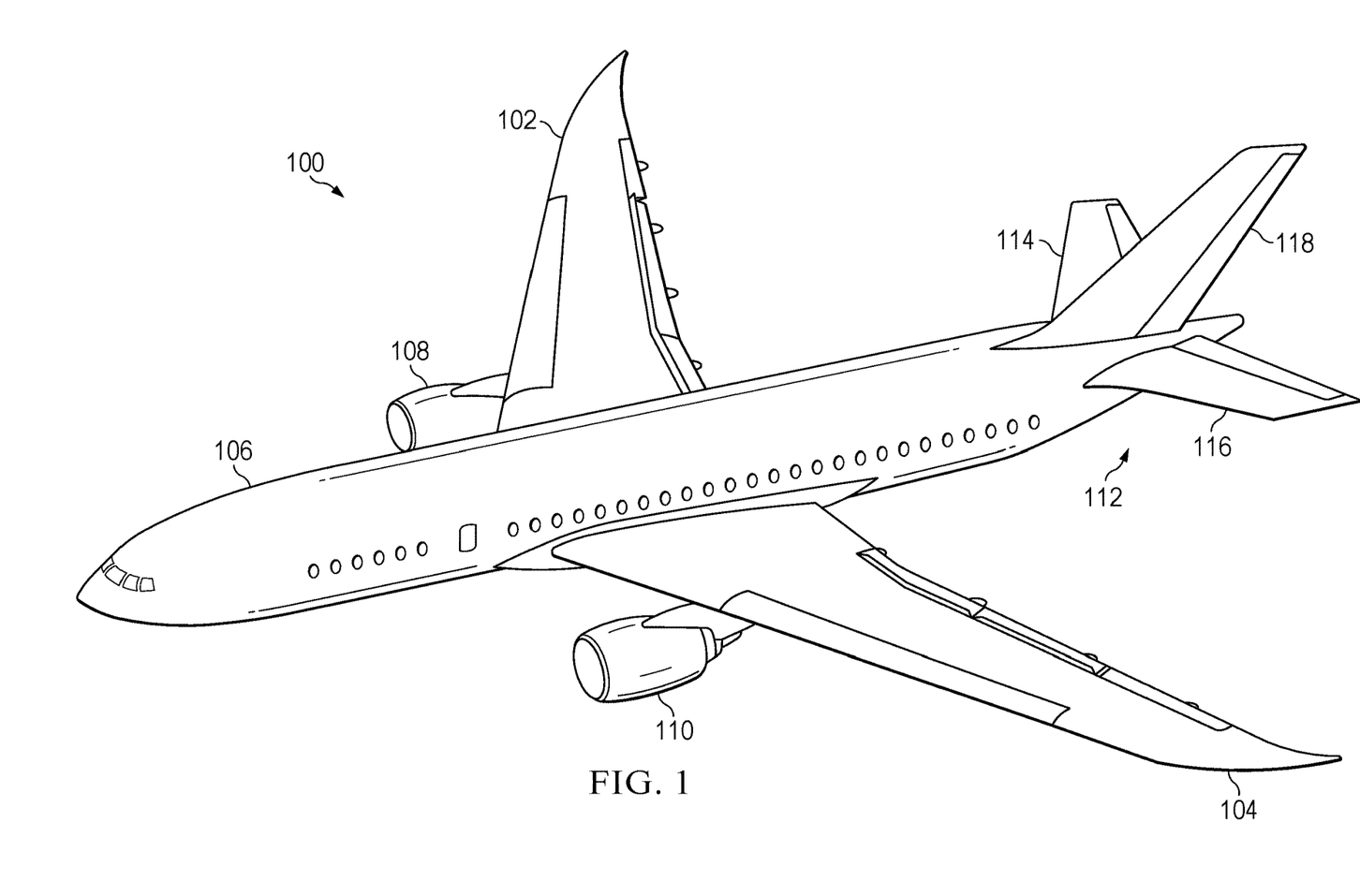
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having components formed of composite products cured using double vacuum debulking. For example, a portion of wing 102 or wing 104 can be formed using double vacuum debulking. As another example, a portion of body 106 can be formed using double vacuum debulking.

Figure 2:
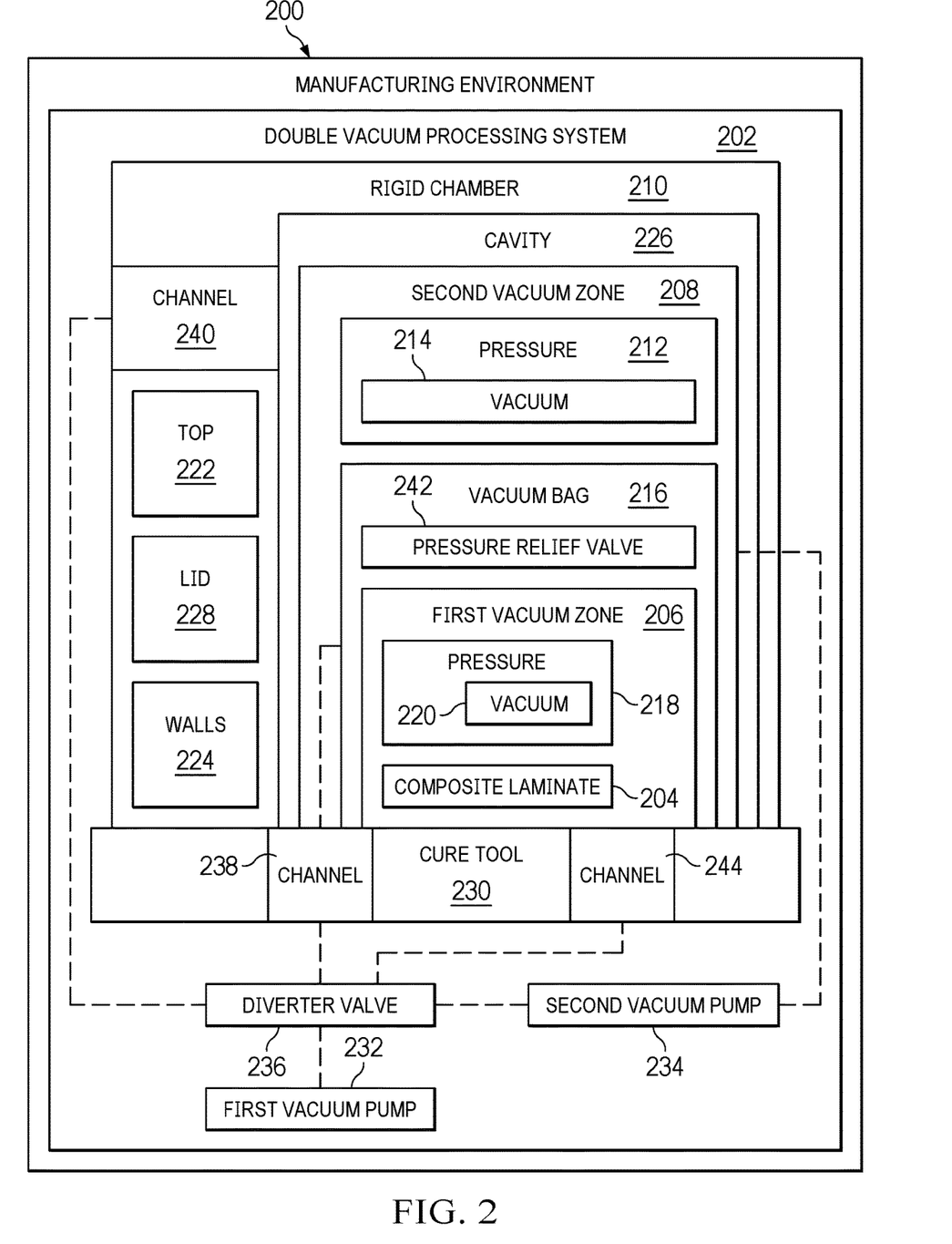
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Portions of aircraft 100 of FIG. 1 can be manufactured in manufacturing environment 200.

Manufacturing environment 200 contains double vacuum processing system 202 configured to debulk and cure composite laminate 204. Composite laminate 204 can take any desirable form. In some illustrative examples, composite laminate 204 comprises a plurality of prepreg plies. In some illustrative examples, composite laminate 204 comprises a honeycomb core.

Double vacuum processing system 202 comprises first vacuum zone 206 enclosing composite laminate 204 and second vacuum zone 208 encompassing first vacuum zone 206. Second vacuum zone 208 is formed by rigid chamber 210. Rigid chamber 210 is configured to withstand pressure 212 to be applied within rigid chamber 210 during processing of composite laminate 204.

Rigid chamber 210 includes top 222 and walls 224 connected to top 222 to form cavity 226. In some illustrative examples, rigid chamber 210 can also be referred to as lid 228 of double vacuum processing system 202.

First vacuum zone 206 is formed by vacuum bag 216 sealed to cure tool 230. Cure tool 230 is configured to support composite laminate 204 during curing.

Rigid chamber 210 is sealed to at least one of vacuum bag 216 or cure tool 230. In some illustrative examples, rigid chamber 210 is sealed to cure tool 230. In some illustrative examples, rigid chamber 210 is sealed to vacuum bag 216. In some illustrative examples, rigid chamber 210 is sealed to vacuum bag 216 such that rigid chamber 210 and vacuum bag 216 are raised and lowered together. In these illustrative examples, second vacuum zone 208 is maintained prior to forming first vacuum zone 206 around composite laminate 204 on cure tool 230. Raising and lowering rigid chamber 210 connected to vacuum bag 216 can reduce manufacturing time. In some illustrative examples, raising and lowering rigid chamber 210 connected to vacuum bag 216 can enable an automated curing process.

In some illustrative examples, when rigid chamber 210 is sealed and connected to vacuum bag 216, vacuum bag 216 is sealed to cure tool 230. In some illustrative examples, sealant material (not depicted) is applied between vacuum bag 216 and cure tool 230 to form first vacuum zone 206.

First vacuum pump 232 is connected to first vacuum zone 206. First vacuum pump 232 is configured to control pressure 218 within first vacuum zone 206. First vacuum pump 232 is configured to pull vacuum 220 within first vacuum zone 206 to degas composite laminate 204.

Second vacuum pump 234 is configured to control pressure 212 within second vacuum zone 208. Second vacuum pump 234 is connected to second vacuum zone 208. Second vacuum pump 234 is configured to pull vacuum 214 within second vacuum zone 208 to allow vacuum bag 216 to be slack during degas of composite laminate 204. To allow vacuum bag 216 to be slack during degassing, vacuum 214 and vacuum 220 are substantially the same. To regulate vacuum 214 and vacuum 220, diverter valve 236 is present in double vacuum processing system 202.

Double vacuum processing system 202 comprises first vacuum zone 206, second vacuum zone 208 encompassing first vacuum zone 206, first vacuum pump 232 connected to first vacuum zone 206 and configured to draw vacuum 220 within first vacuum zone 206, second vacuum pump 234 connected to second vacuum zone 208 and configured to draw vacuum 214 within second vacuum zone 208, and diverter valve 236 configured to alternate between pneumatically connecting first vacuum zone 206 to second vacuum pump 234 or connecting first vacuum zone 206 to first vacuum pump 232. In some illustrative examples, activating diverter valve 236 pneumatically connects first vacuum zone 206 to second vacuum zone 208. In some illustrative examples, activating diverter valve 236 to pneumatically connect first vacuum zone 206 to second vacuum zone 208 comprises activating diverter valve 236 to close a pneumatic connection from first vacuum zone 206 to first vacuum pump 232 and open a pneumatic connection from first vacuum zone 206 to second vacuum pump 234. During degassing, first vacuum pump 232 initially pulls vacuum 220 within vacuum bag 216. During degassing, diverter valve 236 is activated to pneumatically couple first vacuum zone 206 to second vacuum pump 234. First vacuum zone 206 and second vacuum zone 208 being both pneumatically connected to the same vacuum pump, second vacuum pump 234, maintaining vacuum 214 and vacuum 220 at substantially the same level is simpler than using two vacuum pumps and regulators. First vacuum zone 206 is substantially smaller than second vacuum zone 208. Due to the volumetric differences between first vacuum zone 206 and second vacuum zone 208, any equal adjustments made to the separate vacuum systems using first vacuum pump 232 and second vacuum pump 234 would result in a temporary imbalance in the vacuum levels between first vacuum zone 206 and second vacuum zone 208. The smaller volume of first vacuum zone 206 changes much more quickly than the large volume of second vacuum zone 208. Placing first vacuum zone 206 in communication with second vacuum zone 208 chamber during the gas extraction phase means that any adjustments to vacuum levels, vacuum 214 and vacuum 220, will happen in unison between first vacuum zone 206 and second vacuum zone 208. Diverter valve 236 is actuated to alternate between allowing communication between and isolating first vacuum zone 206 and second vacuum zone 208.

Cure tool 230 forms a first portion of first vacuum zone 206 and vacuum bag 216 completes first vacuum zone 206. In some illustrative examples, communication between first vacuum zone 206 and second vacuum zone 208 is through cure tool 230. In some illustrative examples, double vacuum processing system 202 comprises channel 238 through cure tool 230 connecting first vacuum zone 206 to second vacuum zone 208 through diverter valve 236. Additional not depicted conduits are present to pneumatically connect diverter valve 236 to first vacuum zone 206 and second vacuum zone 208.

Cure tool 230 forms a bottom portion of second vacuum zone 208. Rigid chamber 210 forms a top portion of second vacuum zone 208. In some illustrative examples, channel 238 is not present. In some illustrative examples, double vacuum processing system 202 comprises channel 240 through rigid chamber 210 connecting first vacuum zone 206 to second vacuum zone 208 through diverter valve 236. In other illustrative examples, channel 240 is not present. In some illustrative examples, diverter valve 236 can be connected to conduits connected to second vacuum pump.

In some illustrative examples, vacuum bag 216 comprises pressure relief valve 242 in vacuum bag 216. In some illustrative examples, pressure relief valve 242 is present to prevent inflation of vacuum bag 216.

Double vacuum processing system 202 comprises two vacuum pumps, first vacuum pump 232 and second vacuum pump 234, cure tool 230 configured to support composite laminate 204 for curing, and diverter valve 236 pneumatically connected to first channel, channel 244, and second channel, channel 238, of cure tool 230. Each of first channel, channel 244, and second channel, channel 238, extend through a thickness of cure tool 230. Diverter valve 236 is configured to alternate between connecting first vacuum zone 206 formed in part by cure tool 230 to a respective one of the two vacuum pumps, first vacuum pump 232 and second vacuum pump 234.

Vacuum bag 216 is sealed to cure tool 230 to form first vacuum zone 206 enclosing composite laminate 204. First channel, channel 244, extends into first vacuum zone 206. In some illustrative examples, second channel, channel 238, extends into second vacuum zone 208.

After degassing with first vacuum zone 206 and second vacuum zone 208 in pneumatic communication, first vacuum zone 206 is pneumatically isolated from second vacuum zone 208. During debulk of composite laminate 204, first vacuum pump 232 pulls vacuum 220 within first vacuum zone 206 enclosing composite laminate 204. During debulk of composite laminate 204, second vacuum pump 234 pulls a second vacuum, vacuum 214, within second vacuum zone 208 surrounding first vacuum zone 206. Composite laminate 204 is heated while vacuum 220 is within first vacuum zone 206 and vacuum 214 is within second vacuum zone 208. Afterwards, vacuum 214 in second vacuum zone 208 is released to compress composite laminate 204.

In some illustrative examples, during compression portions of the debulk, vacuum 220 with first vacuum zone 206 is a higher vacuum than vacuum 214 in second vacuum zone 208. During some of the processing, pressure 212 in second vacuum zone 208 is greater than pressure 218 in first vacuum zone 206 to allow for compression of composite laminate 204. A higher pressure in second vacuum zone 208 applies a compression during recompression and curing. Pressure 212 and 237 are controlled during debulk and curing to prevent vacuum bag 216 from expanding or inflating.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although not depicted, in some illustrative examples, a heat source is positioned within or on top of cure tool 230 to provide heat to composite laminate 204. As another example, illustrations of double vacuum processing system 202 are simplified for descriptive purposes only. As an example, any desirable vacuum components such as cauls, breathers, release films, or other vacuum supporting components although not depicted, can be present in first vacuum zone 206.

In some illustrative examples, vacuum bag 216 also has a pressure relief valve. In these illustrative examples, the pressure relief valve vents from first vacuum zone 206 into second vacuum zone 208.

Figure 3:
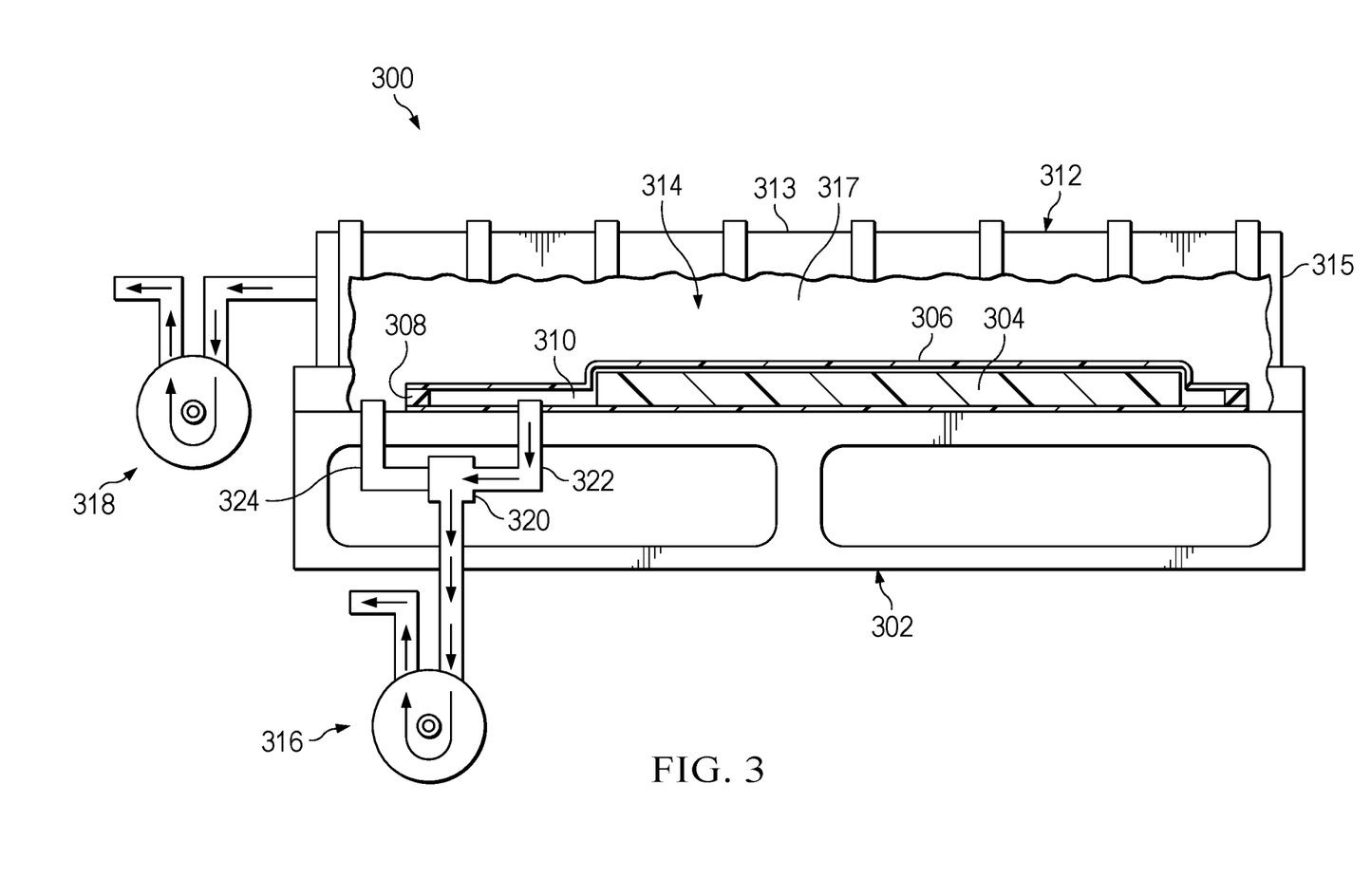
FIG. 3 is an illustration of a partial cross-sectional view of a double vacuum processing system in accordance with an illustrative embodiment.

Turning now to FIG. 3, an illustration of a partial cross-sectional view of a double vacuum processing system is depicted in accordance with an illustrative embodiment. Double vacuum processing system 300 can be used to form a component of aircraft 100 of FIG. 1. Double vacuum processing system 300 is a physical implementation of double vacuum processing system 202 of FIG. 2. Double vacuum processing system 300 is used to debulk and cure composite laminate 304. Double vacuum processing system 300 comprises cure tool 302. Cure tool 302 is configured to support a composite laminate, such as composite laminate 304, during curing. Vacuum bag 306 is sealed over composite laminate 304 by seals 308 to form first vacuum zone 310. Cure tool 302 forms a first portion of first vacuum zone 310. Vacuum bag 306 completes first vacuum zone 310.

Cure tool 302 forms a bottom portion of second vacuum zone 314. Rigid chamber 312 forms a top portion of second vacuum zone 314. In this illustrative example, rigid chamber 312 is sealed to cure tool 302. Rigid chamber 312 comprises top 313 and walls 315. Rigid chamber 312 includes top 313 and walls 315 connected to top 313 to form cavity 317. In this illustrative example, rigid chamber 312 is positioned over and sealed to cure tool 302 to form second vacuum zone 314. Second vacuum zone 314 encompasses first vacuum zone 310.

First vacuum pump 316 is connected to first vacuum zone 310 and configured to draw a vacuum within first vacuum zone 310. First vacuum pump 316 is pneumatically connected to first vacuum zone 310. As depicted, first vacuum pump 316 is pulling a vacuum in first vacuum zone 310.

Second vacuum pump 318 is connected to second vacuum zone 314 and configured to draw a vacuum within second vacuum zone 314. Diverter valve 320 is configured to alternate between pneumatically connecting first vacuum zone 310 to second vacuum pump 318 or connecting first vacuum zone 310 to first vacuum pump 316.

In this illustrative example, channel 322 through cure tool 302 connects first vacuum zone 310 to diverter valve 320. In this illustrative example, channel 324 through cure tool 302 connects first vacuum zone 310 to second vacuum zone 314 through diverter valve 320.

Double vacuum processing system 300 comprises two vacuum pumps, first vacuum pump 316 and second vacuum pump 318, cure tool 302 configured to support composite laminate 304 for curing, and diverter valve 320. Cure tool 302 comprises a first channel, channel 322, and a second channel, channel 324. Each of the first channel and the second channel extends through a thickness of cure tool 302.

Diverter valve 320 is pneumatically connected to the first channel, channel 322, and the second channel, channel 324. Diverter valve 320 is configured to alternate between connecting first vacuum zone 310 formed in part by cure tool 302 to a respective one of the two vacuum pumps.

Figure 4:
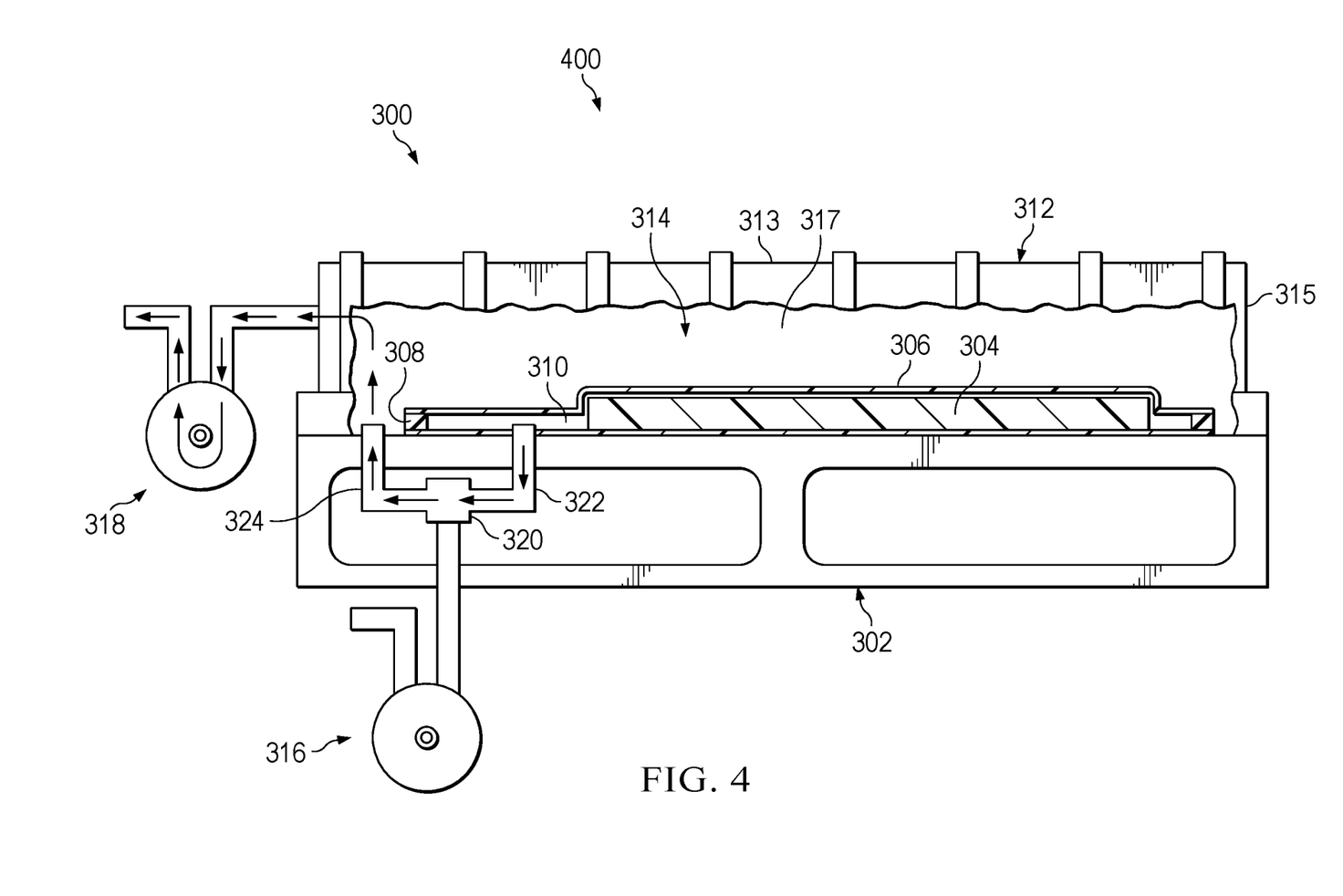
FIG. 4 is an illustration of a partial cross-sectional view of a double vacuum processing system in accordance with an illustrative embodiment.

Turning now to FIG. 4, an illustration of a partial cross-sectional view of a double vacuum processing system is depicted in accordance with an illustrative embodiment. View 400 is a view of double vacuum processing system 300 of FIG. 3 during gas extraction. In view 400, diverter valve 320 has been activated to place first vacuum zone 310 in communication with second vacuum zone 314. In this illustrative example, diverter valve 320 was activated to pneumatically connect first vacuum zone 310 to second vacuum zone 314 during heating in order to perform at least a portion of the gas extraction of the double vacuum debulk. In view 400, second vacuum pump 318 pulls a vacuum in both first vacuum zone 310 and second vacuum zone 314. By placing first vacuum zone 310 in pneumatic communication with second vacuum zone 314, the vacuum is equalized between the two vacuum zones.

Figure 5:
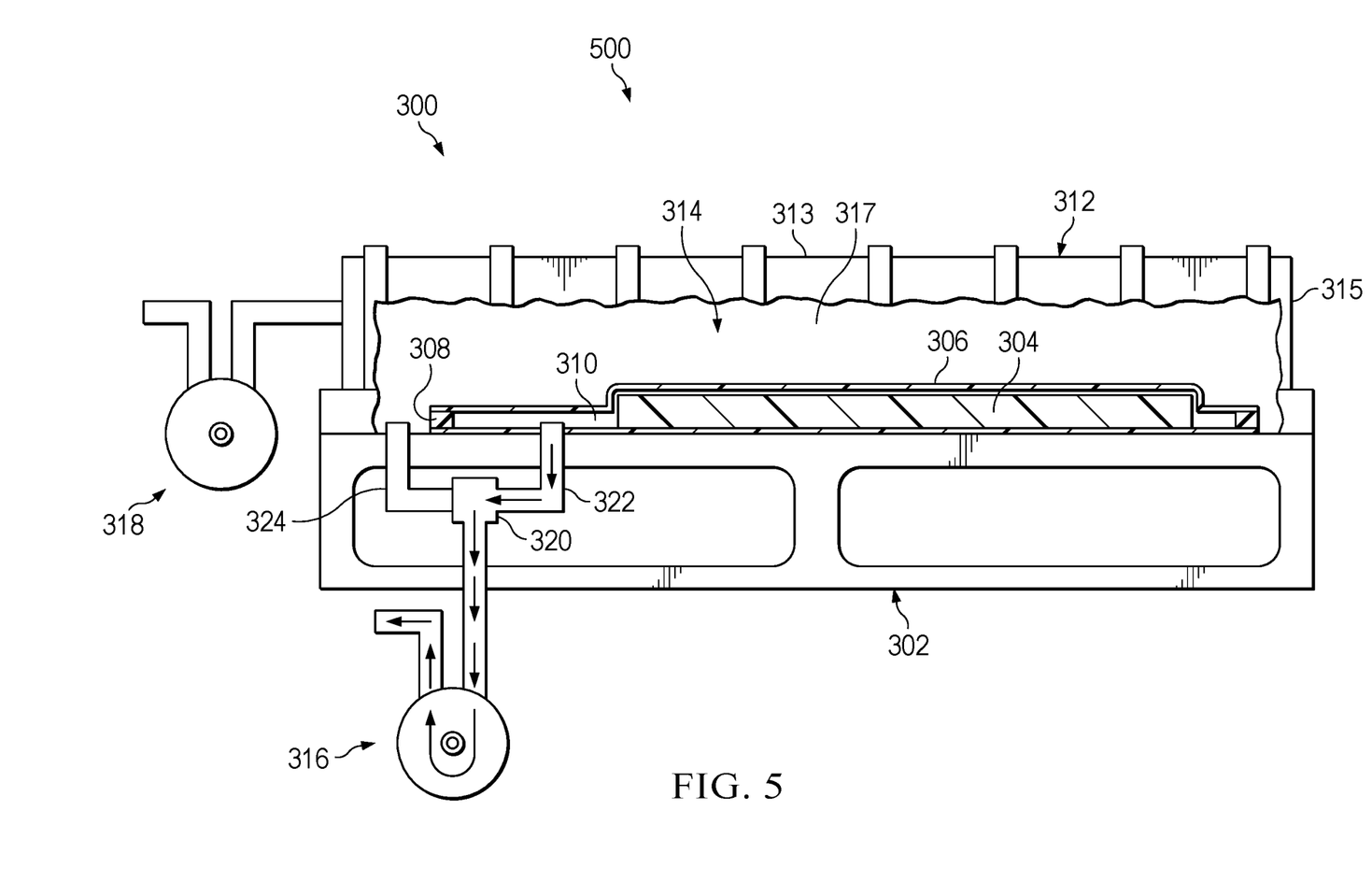
FIG. 5 is an illustration of a partial cross-sectional view of a double vacuum processing system in accordance with an illustrative embodiment.

Turning now to FIG. 5, an illustration of a partial cross-sectional view of a double vacuum processing system is depicted in accordance with an illustrative embodiment. View 500 is a view of double vacuum processing system 300 of FIG. 3 during reconsolidation of composite laminate 304. Between view 400 and view 500, diverter valve 320 was activated to pneumatically isolate first vacuum zone 310 from second vacuum zone 314. The two vacuum zones, first vacuum zone 310 and second vacuum zone 314, are pneumatically isolated following gas extraction and prior to curing composite laminate 304.

Figure 6:
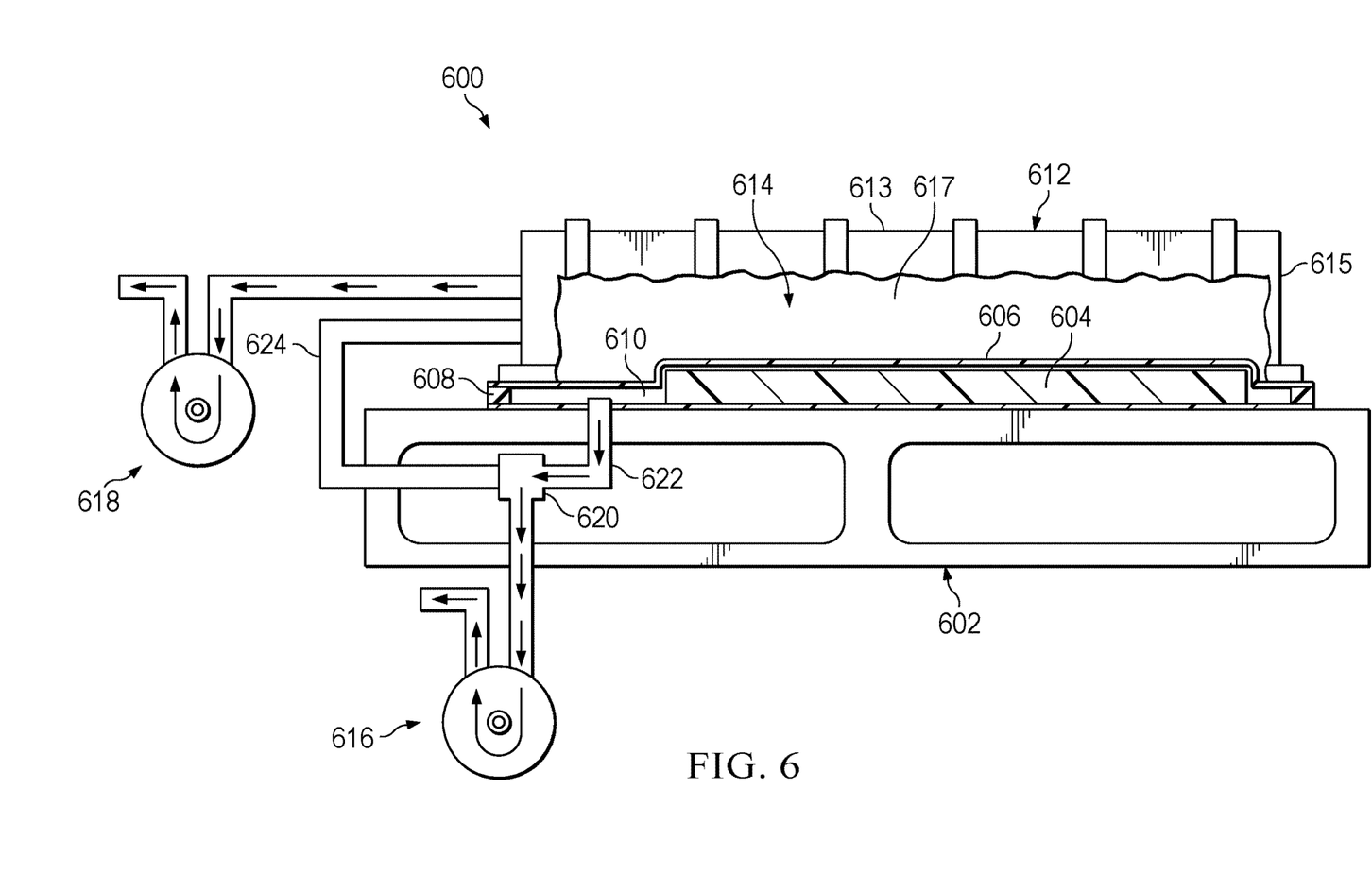
FIG. 6 is an illustration of a partial cross-sectional view of a double vacuum processing system in accordance with an illustrative embodiment.

Turning now to FIG. 6, an illustration of a partial cross-sectional view of a double vacuum processing system is depicted in accordance with an illustrative embodiment. Double vacuum processing system 600 can be used to form a component of aircraft 100 of FIG. 1. Double vacuum processing system 600 is a physical implementation of double vacuum processing system 202 of FIG. 2. Double vacuum processing system 600 is an alternate design to double vacuum processing system 300 of FIGS. 3-5.

Double vacuum processing system 600 is used to debulk and cure composite laminate 604. Double vacuum processing system 600 comprises cure tool 602. Cure tool 602 is configured to support a composite laminate, such as composite laminate 604, during curing. Vacuum bag 606 is sealed over composite laminate 604 by seals 608 to form first vacuum zone 610. Cure tool 602 forms a first portion of first vacuum zone 610. Vacuum bag 606 completes first vacuum zone 610.

Cure tool 602 forms a bottom portion of second vacuum zone 614. Rigid chamber 612 forms a top portion of second vacuum zone 614. In this illustrative example, rigid chamber 612 is sealed to cure tool 602. Rigid chamber 612 comprises top 613 and walls 615. Rigid chamber 612 includes top 613 and walls 615 connected to top 613 to form cavity 617. In this illustrative example, rigid chamber 612 is positioned over and sealed to cure tool 602 to form second vacuum zone 614. Second vacuum zone 614 encompasses first vacuum zone 610.

First vacuum pump 616 is connected to first vacuum zone 610 and configured to draw a vacuum within first vacuum zone 610. First vacuum pump 616 is pneumatically connected to first vacuum zone 610. As depicted, first vacuum pump 616 is pulling a vacuum in first vacuum zone 610.

Second vacuum pump 618 is connected to second vacuum zone 614 and configured to draw a vacuum within second vacuum zone 614. Diverter valve 620 is configured to alternate between pneumatically connecting first vacuum zone 610 to second vacuum pump 618 or connecting first vacuum zone 610 to first vacuum pump 616.

In this illustrative example, channel 622 through cure tool 602 connects first vacuum zone 610 to diverter valve 620. Channel 624 through rigid chamber 612 connects first vacuum zone 610 to second vacuum zone 614 through diverter valve 620.

Figure 7:
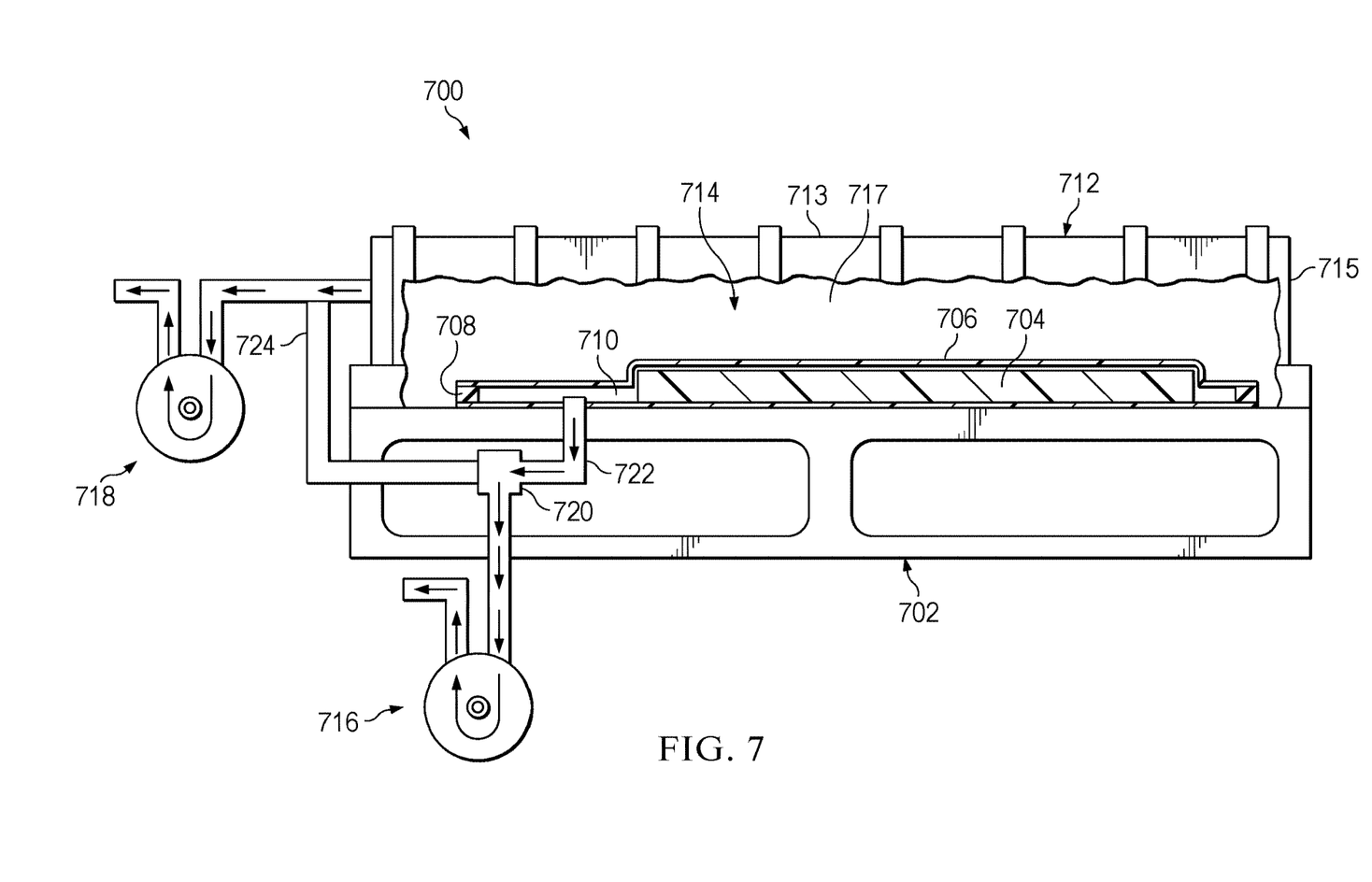
FIG. 7 is an illustration of a partial cross-sectional view of a double vacuum processing system in accordance with an illustrative embodiment.

Turning now to FIG. 7, an illustration of a partial cross-sectional view of a double vacuum processing system is depicted in accordance with an illustrative embodiment. Double vacuum processing system 700 can be used to form a component of aircraft 100 of FIG. 1. Double vacuum processing system 700 is a physical implementation of double vacuum processing system 202 of FIG. 2. Double vacuum processing system 700 is an alternate design to double vacuum processing system 300 of FIGS. 3-5.

Double vacuum processing system 700 is used to debulk and cure composite laminate 704. Double vacuum processing system 700 comprises cure tool 702. Cure tool 702 is configured to support a composite laminate, such as composite laminate 704, during curing. Vacuum bag 706 is sealed over composite laminate 704 by seals 708 to form first vacuum zone 710. Cure tool 702 forms a first portion of first vacuum zone 710. Vacuum bag 706 completes first vacuum zone 710.

Cure tool 702 forms a bottom portion of second vacuum zone 714. Rigid chamber 712 forms a top portion of second vacuum zone 714. In this illustrative example, rigid chamber 712 is sealed to cure tool 702. Rigid chamber 712 comprises top 713 and walls 715. Rigid chamber 712 includes top 713 and walls 715 connected to top 713 to form cavity 717. In this illustrative example, rigid chamber 712 is positioned over and sealed to cure tool 702 to form second vacuum zone 714. Second vacuum zone 714 encompasses first vacuum zone 710.

First vacuum pump 716 is connected to first vacuum zone 710 and configured to draw a vacuum within first vacuum zone 710. First vacuum pump 716 is pneumatically connected to first vacuum zone 710. As depicted, first vacuum pump 716 is pulling a vacuum in first vacuum zone 710.

Second vacuum pump 718 is connected to second vacuum zone 714 and configured to draw a vacuum within second vacuum zone 714. Diverter valve 720 is configured to alternate between pneumatically connecting first vacuum zone 710 to second vacuum pump 718 or connecting first vacuum zone 710 to first vacuum pump 716.

In this illustrative example, channel 722 through cure tool 702 connects first vacuum zone 710 to diverter valve 720. In this illustrative example, diverter valve 720 is connected to second vacuum pump 718 by conduit 724.

The illustration of double vacuum processing system 300 in FIGS. 3-7 is not meant to imply physical or architectural limitations to the manner in which an illustrative embodiment may be implemented. Other components in addition to or in place of the ones illustrated may be used. Some components may be unnecessary. For example, instead of being sealed to cure tool 602, in some illustrative examples, rigid chamber 612 is sealed to vacuum bag 606. In these illustrative examples, rigid chamber 612 and vacuum bag 606 can be raised and lowered together relative to cure tool 602.

Figure 8:
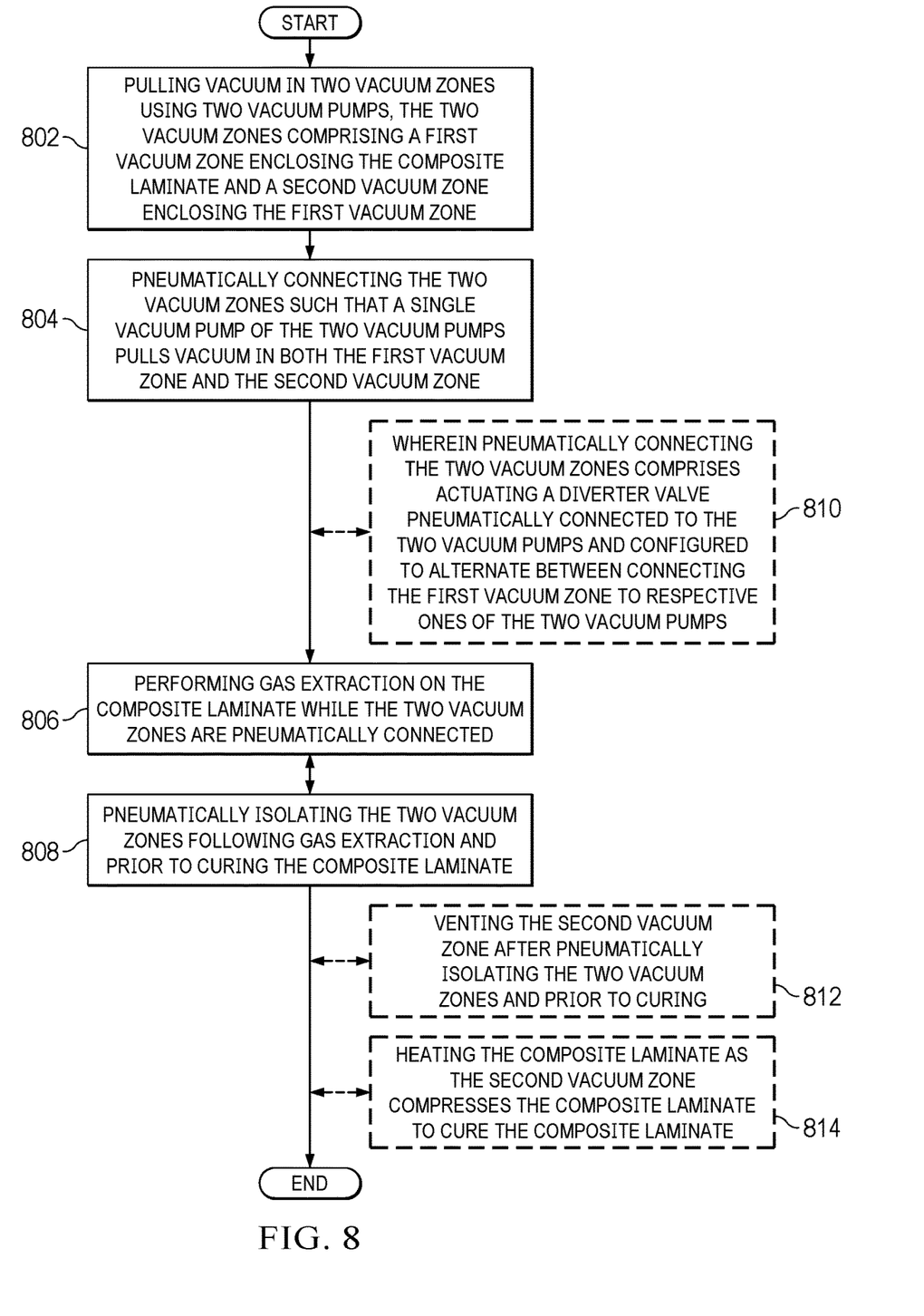
FIG. 8 is a flowchart of a method of performing a cure cycle on a composite laminate in accordance with an illustrative embodiment.

Turning now to FIG. 8, a flowchart of a method of performing a cure cycle on a composite laminate is depicted in accordance with an illustrative embodiment. Method 800 can be performed to form a component of aircraft 100 of FIG. 1. Method 800 can be performed using double vacuum processing system 202 of FIG. 2. Method 800 can be performed using double vacuum processing system 300 of FIGS. 3-5. Method 800 can be performed using double vacuum processing system 600 of FIG. 6. Method 800 can be performed using double vacuum processing system 700 of FIG. 7.

Method 800 pulls vacuum in two vacuum zones using two vacuum pumps, the two vacuum zones comprising a first vacuum zone enclosing the composite laminate and a second vacuum zone enclosing the first vacuum zone (operation 802). Method 800 pneumatically connects the two vacuum zones such that a single vacuum pump of the two vacuum pumps pulls vacuum in both the first vacuum zone and the second vacuum zone (operation 804). Method 800 performs gas extraction on the composite laminate while the two vacuum zones are pneumatically connected (operation 806). Method 800 pneumatically isolates the two vacuum zones following gas extraction and prior to curing the composite laminate (operation 808). Afterwards, method 800 terminates.

In some illustrative examples, pneumatically connecting the two vacuum zones comprises actuating a diverter valve pneumatically connected to the two vacuum pumps and configured to alternate between connecting the first vacuum zone to respective ones of the two vacuum pumps (operation 810).

In some illustrative examples, method 800 vents the second vacuum zone after pneumatically isolating the two vacuum zones and prior to curing (operation 812). In some illustrative examples, method 800 heats the composite laminate as the second vacuum zone compresses the composite laminate to cure the composite laminate (operation 814).

Figure 9:
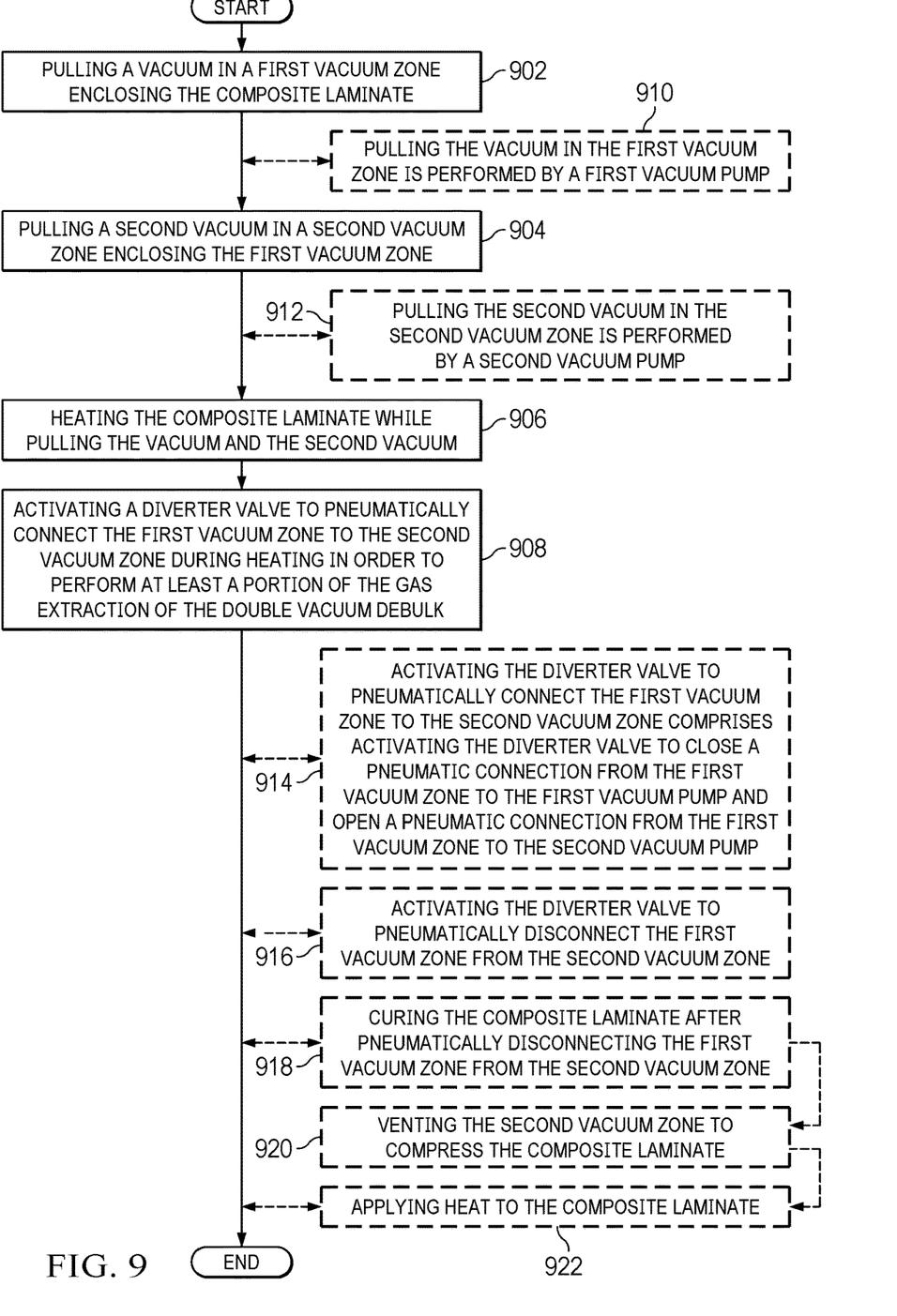
FIG. 9 is a flowchart of a method of performing gas extraction in a double vacuum debulk of a composite laminate in accordance with an illustrative embodiment.

Turning now to FIG. 9, a flowchart of a method of performing gas extraction in a double vacuum debulk of a composite laminate is depicted in accordance with an illustrative embodiment. Method 900 can be performed to form a component of aircraft 100 of FIG. 1. Method 900 can be performed using double vacuum processing system 202 of FIG. 2. Method 900 can be performed using double vacuum processing system 300 of FIGS. 3-5. Method 900 can be performed using double vacuum processing system 600 of FIG. 6. Method 900 can be performed using double vacuum processing system 700 of FIG. 7.

Method 900 pulls a vacuum in a first vacuum zone enclosing the composite laminate (operation 902). Method 900 pulls a second vacuum in a second vacuum zone enclosing the first vacuum zone (operation 904). Method 900 heats the composite laminate while pulling the vacuum and the second vacuum (operation 906). Method 900 activates a diverter valve to pneumatically connect the first vacuum zone to the second vacuum zone during heating in order to perform at least a portion of the gas extraction of the double vacuum debulk (operation 908). Afterwards, method 900 terminates.

In some illustrative examples, pulling the vacuum in the first vacuum zone is performed by a first vacuum pump (operation 910). In some illustrative examples, pulling the second vacuum in the second vacuum zone is performed by a second vacuum pump (operation 912). In some illustrative examples, activating the diverter valve to pneumatically connect the first vacuum zone to the second vacuum zone comprises activating the diverter valve to close a pneumatic connection from the first vacuum zone to the first vacuum pump and open a pneumatic connection from the first vacuum zone to the second vacuum pump (operation 914).

In some illustrative examples, method activates the diverter valve to pneumatically disconnect the first vacuum zone from the second vacuum zone (operation 916). In some illustrative examples, method cures the composite laminate after pneumatically disconnecting the first vacuum zone from the second vacuum zone (operation 918). In some illustrative examples, curing the composite laminate comprises venting the second vacuum zone to compress the composite laminate (operation 920); and applying heat to the composite laminate (operation 922).

Figure 10:
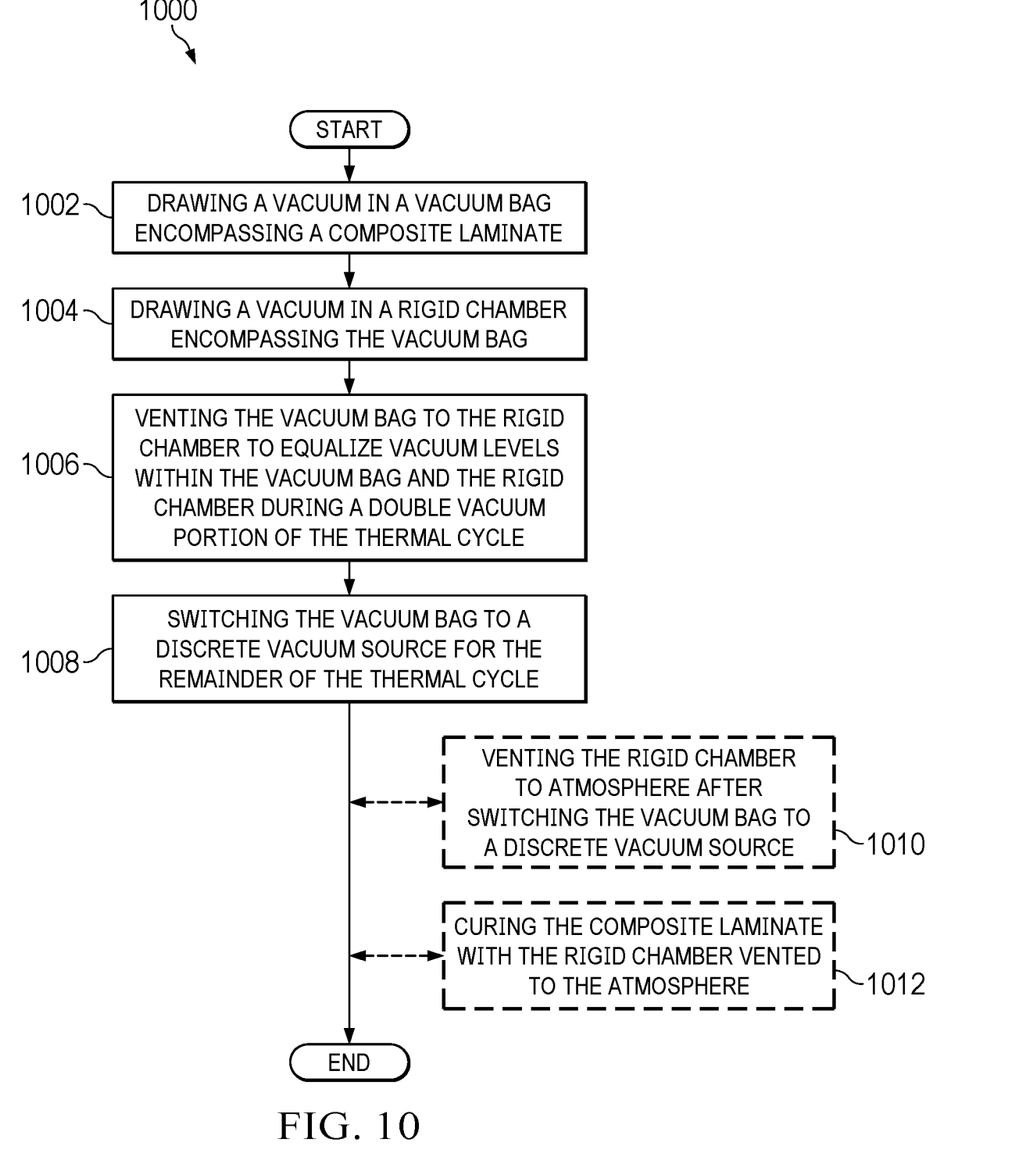
FIG. 10 is a flowchart of a performing a thermal cycle in a double vacuum debulk of a composite laminate in accordance with an illustrative embodiment.

Turning now to FIG. 10, a flowchart of a performing a thermal cycle in a double vacuum debulk of a composite laminate is depicted in accordance with an illustrative embodiment. Method 1000 can be performed to form a component of aircraft 100 of FIG. 1. Method 1000 can be performed using double vacuum processing system 202 of FIG. 2. Method 1000 can be performed using double vacuum processing system 300 of FIGS. 3-5. Method 1000 can be performed using double vacuum processing system 600 of FIG. 6. Method 1000 can be performed using double vacuum processing system 700 of FIG. 7.

Method 1000 draws a vacuum in a vacuum bag encompassing a composite laminate (operation 1002). Method 1000 draws a vacuum in a rigid chamber encompassing the vacuum bag (operation 1004). Method 1000 vents the vacuum bag to the rigid chamber to equalize vacuum levels within the vacuum bag and the rigid chamber during a double vacuum portion of the thermal cycle (operation 1006). Method 1000 switches the vacuum bag to a discrete vacuum source for a remainder of the thermal cycle (operation 1008). Afterwards, method 1000 terminates.

In some illustrative examples, method 1000 vents the rigid chamber to atmosphere after switching the vacuum bag to a discrete vacuum source (operation 1010). In some illustrative examples, method 1000 cures the composite laminate with the rigid chamber vented to the atmosphere (operation 1012).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 810 through operation 814 may be optional. For example, operation 910 through operation 922 may be optional.

Figure 11:
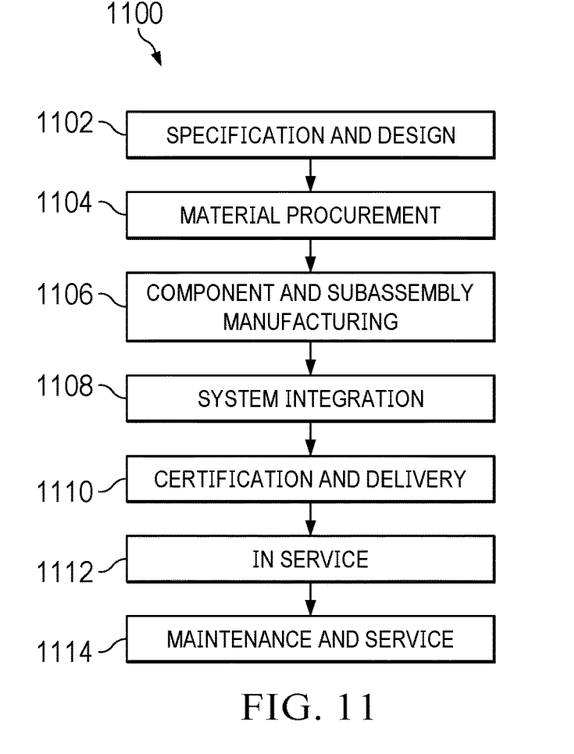
FIG. 11 is an illustration of an aircraft manufacturing and service method in a form of a block diagram in accordance with an illustrative embodiment.
Figure 12:
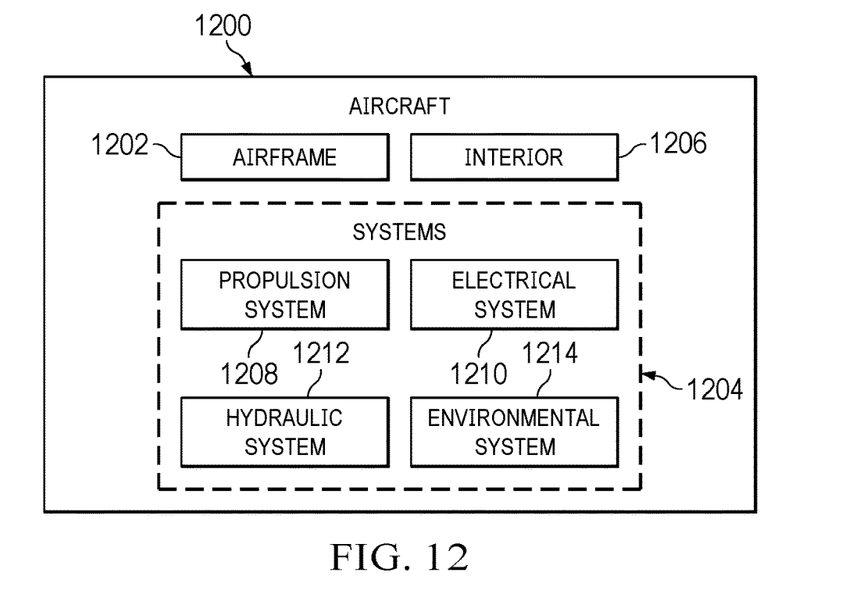
FIG. 12 is an illustration of an aircraft in a form of a block diagram in which an illustrative embodiment may be implemented.

Illustrative embodiments of the present disclosure may be described in the context of aircraft manufacturing and service method 1100 as shown in FIG. 11 and aircraft 1200 as shown in FIG. 12. Turning first to FIG. 11, an illustration of an aircraft manufacturing and service method in a form of a block diagram is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 takes place. Thereafter, aircraft 1200 may go through certification and delivery 1110 in order to be placed in service 1112. While in service 1112 by a customer, aircraft 1200 is scheduled for routine maintenance and service 1114, which may include modification, reconfiguration, refurbishment, or other maintenance and service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft in a form of a block diagram is depicted in which an illustrative embodiment may be implemented. In this example, aircraft 1200 is produced by aircraft manufacturing and service method 1100 of FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included.

Apparatuses and methods embodied herein may be employed during at least one of the stages of aircraft manufacturing and service method 1100. One or more illustrative embodiments may be manufactured or used during at least one of component and subassembly manufacturing 1106, system integration 1108, in service 1112, or maintenance and service 1114 of FIG. 11.

A portion of airframe 1202 of aircraft 1200 can be formed by one of method 800, method 900, method 1000. At least one of method 800, method 900, method 1000 can be performed during component and subassembly manufacturing 1106. A composite structure formed using one of method 800, method 900, method 1000 can be present and utilized during in service 1112. At least one of method 800, method 900, method 1000 can be performed during maintenance and service 1114 to form a replacement part.

The illustrative examples provide improved double vacuum debulk processing. The double vacuum debulk system of the illustrative examples comprises a diverter valve that enables communication between a first vacuum zone and a second vacuum zone during degassing of a composite laminate within the first vacuum zone. Communication between the first vacuum zone and the second vacuum zone can reduce the complexity of performing gas extraction of a double vacuum debulk. Communication between the first vacuum zone and the second vacuum zone can improve quality of the resulting composite by preventing compression of the composite laminate during gas extraction. Communication between the first vacuum zone and the second vacuum zone can improve quality of the resulting composite by preventing expansion of the vacuum bag during gas extraction.

A double vacuum debulk process can include a single vacuum phase, a double vacuum phase, and a consolidation phase. During the single vacuum phase, a composite laminate is placed in a vacuum bag under one atmosphere of pressure. During the single vacuum phase, air is trapped in the composite laminate by vacuum clamping pressure.

During a double vacuum phase, the composite laminate in the vacuum bag is placed in a rigid vacuum chamber and the vacuum chamber is evacuated to cancel out atmospheric pressure (clamping force) on the vacuum bag. The composite laminate is then heated to the minimum resin viscosity with no clamping but under vacuum evacuation. Entrapped air and volatiles are extracted from the laminate during this phase of the debulk.

To improve upon the conventional processing, the illustrative examples place the first vacuum zone and the second vacuum zone in communication to improve the double vacuum phase. The illustrative examples prevent vacuum bag relaxation and vacuum bag compaction of the composite laminate while in the evacuated double vacuum debulk chamber.

Double vacuum debulk (DVD) processing is most effective when the vacuum levels in the vacuum bag and rigid chamber are equal. If vacuum level of the rigid chamber is higher than the vacuum bag then the vacuum bag can balloon and destroy the vacuum seal. If the vacuum level of the laminate vacuum bag is too high then clamping force remains on the composite laminate and impedes the air extraction.

The current state of the art is to use vacuum regulators to equalize vacuum levels. The problem with using vacuum regulators is that the large difference in the internal volume of the laminate vacuum bag (very small) and the DVD chamber (very large) causes the laminate bag and DVD chamber to respond at vastly different rates when adjustments are made to equalize vacuum levels. This makes an equalization process undesirably difficult.

The novel solution to this problem presented in the illustrative examples is to vent the laminate vacuum bag to the rigid chamber cavity to equalize vacuum levels between the two vacuum zones during the Double Vacuum portion of the thermal cycle. The illustrative examples prevent pressure differences between the first vacuum zone and the second vacuum zone to prevent ballooning or impedances to the air extraction by created communication between the first vacuum zone and the second vacuum zone.

Following gas extraction, the first vacuum zone and the second vacuum zone are isolated. Prior to venting the DVD chamber the laminate vacuum bag would be switched back to a discrete vacuum source for the remainder of the cure. Following gas extraction, consolidation is performed. During consolidation, the vacuum chamber is vented. Venting the rigid chamber reapplies clamping pressure to the composite laminate to consolidate the plies post air extraction. The low viscosity resin flows over the composite laminate, preventing air from reentering the laminate.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of performing a cure cycle on a composite laminate comprising:
   pulling vacuum in two vacuum zones using two vacuum pumps, the two vacuum zones comprising a first vacuum zone in a vacuum bag enclosing the composite laminate and a second vacuum zone enclosing the first vacuum zone;
   pneumatically connecting the two vacuum zones such that a single vacuum pump of the two vacuum pumps pulls vacuum in both the first vacuum zone and the second vacuum zone;
   performing gas extraction on the composite laminate while the two vacuum zones are pneumatically connected;
   pneumatically isolating the two vacuum zones following gas extraction and prior to curing the composite laminate;
   venting the first vacuum zone to the second vacuum zone by a pressure relief valve in the vacuum bag to prevent inflation of the vacuum bag; and
   heating and curing the composite laminate.
2. The method of claim 1, wherein pneumatically connecting the two vacuum zones comprises actuating a diverter valve pneumatically connected to the two vacuum pumps and configured to alternate between connecting the first vacuum zone to respective ones of the two vacuum pumps.
3. The method of claim 1 further comprising:
   venting the second vacuum zone after pneumatically isolating the two vacuum zones and prior to curing.
4. The method of claim 3 wherein the heating and curing the composite laminate further comprises:
   heating the composite laminate as the second vacuum zone compresses the composite laminate to cure the composite laminate.
5. The method of claim 1 further comprising:
   sealing the vacuum bag to a cure tool to form the first vacuum zone of the two vacuum zones enclosing the composite laminate.
6. The method of claim 5 further comprising:
   sealing a rigid chamber to one of the cure tool or the vacuum bag to form the second vacuum zone of the two vacuum zones enclosing the first vacuum.
7. The method of claim 6, further comprising a channel through the rigid chamber connecting the first vacuum zone to the second vacuum zone through a diverter valve.
8. The method of claim 5, further comprising a channel through the cure tool connecting the first vacuum zone to the second vacuum zone through a diverter valve.
9. A method of performing gas extraction in a double vacuum debulk of a composite laminate comprising:
   pulling a vacuum in a vacuum bag forming a first vacuum zone enclosing the composite laminate;
   pulling a second vacuum in a second vacuum zone enclosing the first vacuum zone;
   heating the composite laminate while pulling the vacuum and the second vacuum;
   activating a diverter valve to pneumatically connect the first vacuum zone to the second vacuum zone during heating in order to perform at least a portion of the gas extraction of the double vacuum debulk; and
   venting the first vacuum zone to the second vacuum zone by a pressure relief valve in the vacuum bag to prevent inflation of the vacuum bag.
10. The method of claim 9, wherein:
    pulling the vacuum in the first vacuum zone is performed by a first vacuum pump;
    pulling the second vacuum in the second vacuum zone is performed by a second vacuum pump; and
    activating the diverter valve to pneumatically connect the first vacuum zone to the second vacuum zone comprises activating the diverter valve to close a pneumatic connection from the first vacuum zone to the first vacuum pump and open a pneumatic connection from the first vacuum zone to the second vacuum pump.
11. The method of claim 9 further comprising:
    activating the diverter valve to pneumatically disconnect the first vacuum zone from the second vacuum zone; and
    curing the composite laminate after pneumatically disconnecting the first vacuum zone from the second vacuum zone.
12. The method of claim 11, wherein curing the composite laminate comprises:
    venting the second vacuum zone to compress the composite laminate; and
    applying heat to the composite laminate.
13. The method of claim 9 further comprising:
    sealing the vacuum bag to a cure tool to form the first vacuum zone enclosing the composite laminate.

14. The method of claim 13 further comprising:
sealing a rigid chamber to one of the cure tool or the vacuum bag to form the second vacuum zone enclosing the first vacuum zone.

15. A method of performing a thermal cycle in a double vacuum debulk of a composite laminate comprising:
drawing a first vacuum in a vacuum bag encompassing a composite laminate;
drawing a second vacuum in a rigid chamber encompassing the vacuum bag;
venting the vacuum bag to the rigid chamber to equalize vacuum levels within the vacuum bag and the rigid chamber during a double vacuum portion of the thermal cycle; and
switching the vacuum bag to a discrete vacuum source for a remainder of the thermal cycle;
venting the first vacuum to the second vacuum by a pressure relief valve in the vacuum bag to prevent inflation of the vacuum bag; and
heating and curing the composite laminate.

16. The method of claim 15 further comprising:
venting the rigid chamber to atmosphere after switching the vacuum bag to a discrete vacuum source.

17. The method of claim 16 wherein the heating and curing the composite laminate further comprises:
curing the composite laminate with the rigid chamber vented to the atmosphere.

18. The method of claim 15 further comprising:
sealing the vacuum bag to a cure tool to form the first vacuum encompassing the composite laminate.

19. The method of claim 18 further comprising:
sealing the rigid chamber to one of the cure tool or the vacuum bag to form the second vacuum encompassing the first vacuum.

20. The method of claim 15, wherein switching the vacuum bag to a discrete vacuum source for a remainder of the thermal cycle comprises activating a diverter valve pneumatically connecting the vacuum bag to two vacuum pumps including the discrete vacuum source.

* * * * *